Jan. 13, 1948.  R. C. BARKELEW  2,434,343
RESISTANCE WELDING ELECTRODE AND HOLDER
Filed June 14, 1943
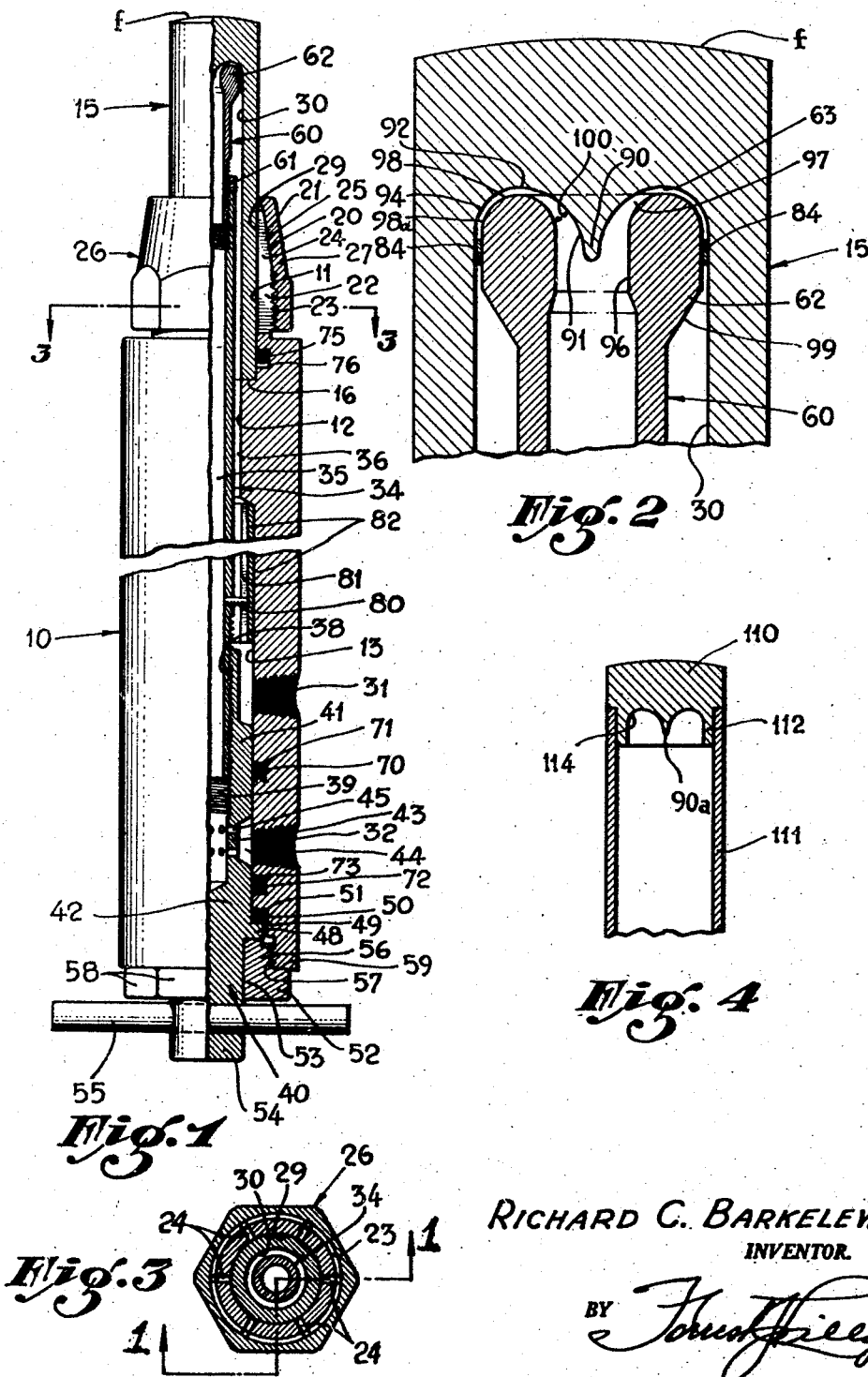
RICHARD C. BARKELEW,
INVENTOR.
BY
ATTORNEY.

Patented Jan. 13, 1948

2,434,343

UNITED STATES PATENT OFFICE 2,434,343

RESISTANCE WELDING ELECTRODE AND HOLDER

Richard C. Barkelew, Los Angeles, Calif.

Application June 14, 1943, Serial No. 490,724

20 Claims. (Cl. 219—4)

This invention relates to electrical resistance welding electrodes and electrode holder assemblies, and more particularly to improvements in these assemblies by which faster and more trouble-free electrode changing, as well as enhanced performance of its function by the electrode, may be accomplished.

Previously used electrodes and holders are of the three categories: (1) Electrodes not liquid cooled. (2) Liquid cooled electrodes with a tapered shank to fit into a tapered hole in the electrode holder. (3) Liquid cooled electrodes with a male or female thread shank to mate with the corresponding holder. Cooling is accomplished in the second and third classes by forcing water through a tube which extends into the hole in the electrode, the coolant returning along the outside of the tube. The tube is usually cut off at its discharge end at an angle and the shape of the hole in the electrode is the same, or similar to, the contour left by the standard drill.

Electrodes not liquid cooled are usually unsuitable for production work because of excessive heating and are seldom used on such work except where space limitations are so rigid as to preclude the use of cooled electrodes, and attention will accordingly be confined herein to liquid cooled electrodes. The tapered shank type of liquid cooled electrode and holder is not entirely satisfactory because of the difficulty encountered in changing electrodes, particularly when high pressures are used in the welding, as the tapers and tapered hole holders are easily distorted when electrodes are subject to side pressure. Also, the tapers on this type must be precision made, which is a disadvantage in manufacture and maintenance. The threaded electrode type is expensive to manufacture, and frequently the threads tend to bind because of the nature of the metals used in resistance welding electrodes. Moreover, in production spot welding the time between operations is frequently too short to permit previously used cooling arrangements to cool the electrode sufficiently. This enhances annealing of the electrode, with consequent electrode depreciation. In the case of some work—notably the welding of aluminum—the heat from the insufficiently cooled electrode tends to heat the aluminum on the outside surface, causing serious depreciation of the quality of the weld. Under these conditions either production rates are slowed down, electrodes must be cleaned after few operations, or welds are inconsistent.

With these disabilities of previously known resistance welding rod electrodes and holders in mind, objects of the present invention include the following:

To provide an improved electrode and holder assembly of the liquid-cooled type which is simple and relatively inexpensive to manufacture, provides rigid support for the electrode rod, and permits the electrode rod to be changed with exceptional speed and facility;

To provide an electrode and holder assembly in which machining operations to produce the electrode are minimized;

To provide an electrode holder which is simple and sturdy, requires no special tools for its use, supports the electrode in a positive position regardless of pressure, is adequately sealed against leakage, and makes positive electrical connection with the electrode; and To provide liquid-cooling system in a welding electrode and holder by which an increased degree of cooling may be obtained.

Detailed description of the invention will be reserved for the body of the specification, though a brief introductory outline of the underlying theory of my improved liquid-cooling system may be helpful at this point. The liquid cooling system of the present invention operates to increase the degree of cooling obtained by, first, increasing the effective cooling area, and second, increasing the rate of heat transfer per unit area. The increase in the rate of heat transfer is brought about by the provision of a restriction in the cross-sectional area of the liquid passage within the region of the electrode area from which the heat is to be extracted, thereby, in accordance with Bernoulli's law, causing a simultaneous increase in the velocity of flow of the coolant and a reduction in its pressure within the region of the area to be cooled. The increase in velocity enhances the cooling action by sweeping away the insulating steam or vapor films that tend to collect on the area to be cooled, and the decrease in pressure lowers the temperature at which the coolant is vaporized or converted to steam, and hence increases the quantity of coolant vaporized, and therefore the quantity of heat absorbed by the coolant. These heat transfer principles and features embodied in my welding electrode and holder assembly may have wider application in heat transfer apparatus generally, and I accordingly wish it to be understood that I do not limit myself to welding electrodes and holders but contemplate the broader field of heat transfer apparatus generally insofar as such features are concerned.

Further objects, features and accomplishments of the invention will appear in the course of the following detailed description of a present preferred embodiment thereof, reference for this purpose being had to the accompanying drawings, in which:

Fig. 1 is a view, with a quarter section removed in accordance with line 1—1 of Fig. 3, of an electrode and holder in accordance with the invention;

Fig. 2 is an enlarged longitudinal sectional view of a portion of the electrode and coolant tube;

Fig. 3 is a cross-section on line 3—3 of Fig. 1; and

Fig. 4 is a longitudinal section of a modified electrode.

The electrode holder comprises a generally cylindrical body 10 formed with an axial electrode receiving bore or cylindrical socket 11 of uniform diameter extending into the forward end thereof. Bore 11 meets a reduced axial bore 12, and the latter meets an enlarged axial bore 13 which opens through the rearward end of the body. The electrode 15, which comprises a smooth, straight cylindrical rod, of uniform diameter, cut off square at its butt end, i. e., at right angles to its central axis, and hollowed out as presently to be described, is receivable in the bore or socket 11 with a comparatively close sliding fit, and bottoms on the shoulder 16 formed at the juncture of bores 11 and 12. The depth of the socket 11 is sufficient to assure rigid support of the electrode rod, but should not be any greater than necessary, since the greater the depth of this socket, the greater is the waste length of electrode rod.

The forward end of body 10 has a reduced projection or nose 20 having a tapered forward part 21, and a cylindrical rearward part 22 formed with external screwthreads 23. This nose 20 is longitudinally split, as at 24, so as to form fingers 25 which are compressible radially to grip or clamp electrode rod 15 by means of a nut 26 adapted to be screwed onto screwthreaded part 22 and formed with a convergent or tapered part 27 engageable with the tapered portion 21 of said nose. When this nut 26 is tightened, the compressible fingers 25 clamp the electrode rod in proportion to the pressure exerted on the nut. By using a proper taper and thread pitch, for instance, about as illustrated, adequate pressure on the electrode rod is easily secured, and the nut may be set up or released without excessive turning.

The bore 11 within the region of the upper portions of the fingers 25 is preferably roughened so as to afford a positive, biting contact between said fingers and the electrode; for instance, this roughening may be provided by machining the fingers with a very fine V-thread at 29 (because of the fineness of these threads, no attempt is made to show them in the drawings).

The novel mounting arrangement for the electrode rod as thus described is of substantial advantage as compared with any type heretofore in use. Not only are expensive and unsatisfactory tapers and screwthreads avoided entirely, but the clamping means on the holder in conjunction with the simple cylindrical rod shape of the electrode afford a simple, positive and sturdy construction. The rods may be changed with greatly increased facility, and the increased simplicity in the external form of the consumable electrode rod greatly simplifies and lessens the cost of its manufacture.

The butt or rearward end of the electrode rod 15 has an axial bore or coolant hole 30 extending into it, in the usual manner, but the inner end of the hole is given a special shape, as will later be described. The previously mentioned bore 12 in body 10 is preferably of the same diameter as the hole 30 in the electrode rod, and serves to pass the coolant returning from hole 30 downwardly or rearwardly in the holder 10 to the enlarged bore 13, and thence to a coolant outlet 31 extending through the sidewall of body 10. This outlet 31 is screwthreaded to receive a suitable fitting (not shown) on the end of a usual pipe or hose.

Extending similarly through the sidewall of holder body 10, somewhat rearwardly of outlet 31, is a coolant inlet 32, also screwthreaded to receive a fitting on the end of the usual inlet pipe or hose.

Numeral 34 designates generally a coolant inflow tube, which is axially positioned in bores 12, 13 and 30, and which is of such diameter as to provide flow passages of preferably substantially equal cross-sectional areas within itself and between its outside surface and the surfaces defining the bores 12 and 30. These flow passages are designated by numerals 35 and 36, respectively.

Tube 34 has an externally threaded rearward end portion 38, which is screwed within an internally screwthreaded blind bore 39 extending axially into a rotatable adjusting head 40. Head 40 includes two axially spaced inner and outer cylindrical portions 41 and 42 which are receivable with a relatively close-turning fit within the bore 13 in the body, and which come on opposite sides of coolant inlet 32. These portions 41 and 42 are connected by a substantially thinner neck section 43, which affords a circumferential liquid channel 44 extending therearound and communicating with the inlet 32. The neck section 43 is provided with ports 45 establishing liquid communication between channel 44 and bore 39, and therefore with the inflow liquid passage 35 within the tube 34.

Head 40 has at the base of its above-mentioned section 42 an outwardly extending annular flange 48, accommodated within a counterbore 49 in the rearward end portion of body 10, and a rubber washer or ring 50 placed between this flange and the shoulder 51 at the inner end of counterbore 49 serves to cushion the adjusting head against the pressure of a head nut 52 screwed within the rearward end of the holder. This nut 52 has a central bore 53 through which passes the cylindrical end portion 54 of head 40, said portion 54 projecting through and beyond the nut 52 and carrying a cross-bar 55 which furnishes a handle by which the head 40 may be rotated within the body 10. In the illustrative construction, the nut 52 has a reduced externally screwthreaded inner portion 56 adapted to be screwed into the enlarged internally screwthreaded opening 57 in the end of the body 10, and its inner end is adapted for engagement with the flange 48 on the adjusting head and moves said flange against the rubber cushion 50 as the nut is set up. The enlarged outer portion of the nut has wrench faces 58, and shoulder 59 on the nut is engageable with the rearward end of body 10 to limit inward travel thereof.

In the illustrated embodiment of the invention, the water inflow tube 34 includes a tip or nozzle section 60 screwed into the forward end of the main section of the tube and secured rigidly thereto as by locking, as indicated at 61. This tip or nozzle section 60 has an enlarged bead 62 at its tip cooperating with the inner end of the bore 30 in the electrode rod in the definition of a constricted fluid passageway 63 establishing communication between the larger inflow passageway 35 inside the liquid flow tube and the larger outside return passageway 36 between said tube and the bores 30 and 12.

Coolant is prevented from passing around the outside of head 40 between liquid inlet 32 and liquid outlet 31 by the provision of a suitable liquid seal, consisting preferably of a rubber O-ring 70 seated in an annular groove 71 formed within bore 13 at a point opposite head section 41. Another liquid seal is provided to prevent leakage at the rearward end of the holder, and consists preferably of a rubber O-ring 72 seated in an annular groove 73 formed in bore 13 just to the rear of outlet 32 at a point opposite head section 42.

It is also necessary to seal against leakage of fluid from the front end of the holder, and for this purpose, I provide a further rubber O-ring 75 seated in an annular groove 76 formed within electrode receiving bore 11 between shoulder 16 and the longitudinal splits 24. Liquid in passageway 36 passing between shoulder 16 and the end of the electrode rod to bore 11 acts against sealing ring 75 to force it against the end of the groove, as shown, effectively sealing against leakage of the liquid therepast.

As will be clear from the foregoing description, adjusting head 40 may be rotated relatively to holder body 10, but is so confined by nut 52 that it is not movable in an axial direction relatively to the holder. The coolant tube 34 together with its tip section or nozzle 60, on the other hand, is capable of axial movement with relation to electrode holder 10, but is constrained against relative rotation therein. For instance, the tube 34 may be provided with laterally projecting guide pins 80 (but one of which appears in the drawings) which engage in longitudinal guide grooves or slots 81, in a sleeve 82 fixed within the enlarged bore 13 of the holder body. Consequently, owing to the screwthreaded connection between adjusting head 40 and tube 34, rotation of said head accomplishes longitudinal or axial adjustment of the position of the tube in the holder, and therefore adjustment in the width of the constriction between the nozzle 60 on the end of the tube and the inner end of the coolant hole in the electrode rod.

It is desirable to maintain comparatively accurately the centralized position of the tube 34 in the coolant hole 30, and for this purpose, I indicate spacer lugs 84 which are carried by the bead 62 of the tip 60 and are slidably engageable with the surfaces defining the hole or bore 30. Three of such lugs spaced equally around the bead 62 are adequate.

The enlarged section of Fig. 2 best shows the preferred contour of the inner end of the coolant hole in the electrode rod, and the preferred profile of the tip end of the nozzle 60, which together define the constricted and streamlined coolant passageway in the heat transfer region of the device. In place of the usual shape of the inner end of the coolant hole, which is that of a straight sided 120° cone, with its apex toward the tip end of the electrode, such as is provided by an ordinary drill, the preferred improved contour in accordance with the invention comprises a central cone or point 90, directed toward the open end of the coolant hole, and formed with a concave side surface 91 which finally becomes tangent at 92 to a plane perpendicular to the longitudinal axis of the holder. This point of tangency is preferably about 60% of the radius of the coolant hole 30 outwardly from the central longitudinal axis thereof. Between point of tangency 92 and coolant bore 30 is a surface 94 which is preferably concave and completes a streamlined bounding surface from the tip of the cone 90 to the bore 30. The precise shape of this bounding surface is subject to some modification, particularly outside the point of tangency 92, but it should preferably be streamlined in character so as to minimize turbulence and flow resistance. A comparison of this contour with that in prior use reveals a surface area increase of about 40%, which is sufficient to accomplish a substantial increase in heat transference to the coolant. If the areas are assigned an "effectiveness rating" inversely proportional to the square of the distance of the areas from the face $f$ of the electrode, it is found that the "effective area" of the present shape is about 66% greater as compared with the usual prior practice.

The described surface 91, 94 thus defines one boundary of the passageway 63. The other boundary thereof is formed by the enlarged bead 62 of the nozzle 60, and the profile of the latter is preferably also streamlined, so as to complete the streamlining of the passageway 63. The bead 62 is also preferably so profiled as to function in cooperation with the surface 91, 94 in the definition of a definite constriction in the passageway 63, and this constriction is preferably in the form of a Venturi-tube, providing a gradual, streamlined restriction of cross-sectional area to a section of minimum area across the main surface from which heat is to be extracted, and then a gradual, streamlined expansion, so that turbulence and resistance to flow are held at a minimum. In the present preferred embodiment of the invention, the enlarged bead 62 has a slightly reduced bore 96, beginning somewhat below the tip of the cone 90. The upper end of this reduced bore 96 terminates in a bell-shaped mouth 97 surrounding the major portion of cone 90. This bell-shaped mouth is defined by a half-rounded end surface 98 on the bead, which connects the bore 96 with a cylindric outer bead surface 98a, spaced relatively closely to bore 30, and surface 98 is connected with the outside of the nozzle tube by a conical surface 99. The radius of curvature of the surface 98 is somewhat less than the radius of curvature of the concave side 91 of the cone 90, and the center of curvature of the former is located somewhat above and approximately in vertical alignment with the center of curvature of the latter, as viewed in the aspect of Fig. 2, and as will be evident from an inspection of said figure. Also, the radius of curvature of surface 98 is somewhat less than the radius of curvature of the surface 94, and the centers of curvature of said surfaces are approximately coincident when the device is adjusted to the position of Fig. 2, which represents a normal operating position.

With the surfaces formed as described, there is a central coolant supply passageway in the nozzle, of large cross-sectional area, and providing little flow resistance, and there is an outside return passageway between the outside of the nozzle and the bore 30, also of large cross-sectional area and little flow resistance. Beginning at the tip of the cone 90, the cross-sectional area of the liquid channel is gradually but smoothly restricted, and is at a minimum in the region of the section 100. Continuing outwardly past the section 100, the channel is gradually reduced in width to the point 92, and beyond said point is of uniform width until the converging surface 99 is reached; however, because of the increasing radius, the total cross-sectional area of the channel is actually substantially constant at minimum value from point 100 to the region of point 92, and is very gradually increased from about point 92 to the more sudden expansion at the convergent surface 99.

As predicted by Bernoulli's law, the velocity of fluid flow is materially increased and the pressure of the fluid is materially reduced in the region of the described restriction in the flow channel. Both these effects enhance the rate of heat extraction from the electrode. The increased velocity across the effective cooling surfaces 91, 94 results in sweeping away the heat insulating vapor film that otherwise forms on those surfaces at temperatures above the vaporization temperature of the coolant at the prevailing pressure, and also results in presenting unheated coolant to the heated metal in a more rapid succession at all temperatures. Increased cooling also results from the fact that the velocity of flow is more effective in a restricted channel than in a larger channel, since in the case of the restricted channel, the velocity is effective to the surface of the metal, whereas in relatively large channels, there may be layers of fluid adjacent the defining surfaces of the channel which are of relatively low velocity as compared with the main stream velocity. Attention is further directed to the fact that the high velocity of coolant flow is maintained over the entire inner end surface of the coolant hole in the electrode.

The reduction in pressure of the coolant is also effective in enhancing the cooling rate, since it lowers the vaporization temperature of the coolant, and therefore increases the quantity of coolant that will be vaporized. The latent heat of vaporization of the coolant may by thus increasing the proportion of coolant vaporized be made a much more important factor in the extraction of heat from the electrode.

The above-described adjustment by which the clearance distance between the end of the coolant nozzle and the inner end of the coolant hole may be precision adjusted enables nice regulation of the velocity of coolant flow and of the reduction in coolant pressure.

The rate of coolant flow through the assembly is but little reduced by the described restriction in cross-section in the region of the area to be cooled because of the streamlined contours provided and the resulting reduction in turbulence and overall flow resistance.

In brief summary, my improved electrode and holder have the advantages of simplicity and reduced cost of electrode manufacture, increased facility of electrode changing, better support for the electrode, and materially increased rate of cooling.

In Fig. 4, I have illustrated a modified electrode in accordance with the invention which embodies improvement in point of economy. The tip portion of a resistance welding electrode must be of a special relatively expensive alloy, as is well known, while the only requirements for the shank of the electrode are sufficient strength and electrical conductivity. The electrode shown in Fig. 4 comprises a tip 110 of alloy and a tubular shank 111 which may consist simply of a short length of straight copper tubing. The body of the annular tip 110 is formed in its rearward face with a coaxial projecting annular flange 112, of a diameter to be tightly received within the tubular shank 111, the outside diameter of the tip and of the shank 111 preferably being approximately equal. Preferably, the flange 112 has a slight taper, too slight to be seen in the drawings, and is so dimensioned that its convergent end portion will be received readily within the tube 111, while its diameter at point of juncture with the body of the tip is slightly greater than the inside diameter of the tube. The tube is accordingly stretched slightly as it is driven on over the flange, thus assuring a tight and permanent fit. The flange 112 defines the inner end of the coolant hole, and is preferably formed with a central, concave sided cone 90a and with a fillet 114, completing a streamlined contour similar to that at the inner end of the coolant hole in the electrode of Figs. 1 and 2. This fillet in the case of Fig. 4 functions not only to streamline the inner end of the coolant hole, however, but being located immediately at the base of the flange 112, strengthens said flange against the compressive forces exerted by the tube 111 as the latter is stretched in the process of driving it on over the flange. The construction as thus described not only permits the use of a cheap length of copper tubing in place of an expensive shank of alloy, but is designed for adequate strength under all conditions.

It will of course be understood that the drawings and description are for illustrative purposes only, and that various changes in design, construction and arrangement may be made without departing from the spirit and scope of the invention or of the appended claims.

I claim:

1. In a welding electrode and electrode holder assembly, the combination of an electrode rod having a cylindrical, unthreaded, bored out shank portion of uniform diameter, an elongated holder body having a longitudinal uniform diameter bore extending inwardly from one end thereof and adapted to receive said shank portion with a close sliding fit, a coolant duct in said holder body communicating with said bored out shank portion, and means for clamping said electrode in said bore.

2. In a welding electrode and electrode holder assembly, the combination of an elongated holder body having a longitudinal uniform diameter smoothsided electrode receiving bore extending inwardly from one end thereof, a stop shoulder at the bottom of said bore, an electrode rod having a cylindrical, smooth-sided, bored out shank portion of uniform diameter receivable in said bore and engageable with said stop shoulder, said stop shoulder being adapted to receive the full end thrust of the electrode rod when said rod is pressed against the work, and a coolant duct in said holder body extending from said bored out shank portion past said shoulder.

3. In a welding electrode holder, the combination of an elongated holder body having a longitudinal uniform diameter smooth-sided electrode receiving bore extending inwardly from one end thereof to a limited depth, rod clamping means on said body adapted to be radially constricted to grip a smooth-sided cylindrical electrode rod received in said bore a reduced coolant circulation bore extending inwardly in said body beyond the inner end of said first-mentioned bore, and an annular stop shoulder for the electrode rod formed at the juncture of said bores, said stop shoulder being adapted to receive the full end thrust of the electrode rod when said rod is pressed against the work.

4. In a welding electrode and electrode holder assembly, the combination of an elongated holder body having a longitudinal uniform diameter smooth-sided electrode receiving bore extending inwardly to a limited depth from one end thereof, an annular stop shoulder at the inner end of said bore, adapted to receive the full end thrust of the electrode rod in service, an electrode rod having a cylindrical smooth-sided shank portion of uniform diameter receivable in said bore and engageable at its butt end against said stop shoulder, a longitudinal coolant hole of predetermined depth in said electrode rod and opening through the butt end thereof inside said annular stop shoulder, a longitudinal coolant circulation bore extending inwardly in said body beyond said annular stop shoulder and communicating with said coolant hole in said electrode rod, a coolant supply tube mounted in said holder and annularly spaced inside said coolant circulation bore, said coolant supply tube projecting into and being annularly spaced within said coolant hole and its tip being spaced from the inner end thereof, and tube adjustment means operable to adjustably move said coolant supply tube longitudinally of said body whereby to adjust the spacing between the tip of said tube and the inner end of said coolant hole.

5. In a welding electrode holder, the combination of an elongated holder body having a longitudinally split, externally screwthreaded nose at its forward end, a longitudinal uniform diameter electrode receiving bore extending inwardly into said body through said nose, a stop shoulder at the inner end of said bore engageable by a cylindrical electrode rod to accurately position said rod longitudinally with respect to said holder body, and a clamp nut screwthreaded on said nose and adapted to compress said longitudinally split nose to grip said electrode rod.

6. In a welding electrode holder, the combination of an elongated holder body having an externally screwthreaded nose at its forward end formed with longitudinal splits whereby said nose may be compressed radially, a clamping nut screwthreaded on said nose and adapted to compress said nose when set up, a uniform diameter electrode receiving bore extending inwardly into said body through said nose to a point spaced inwardly from the inner ends of said longitudinal splits, the inner end of said bore forming a seat for the received electrode rod, there being a fluid passageway extending into said body past said seat, an annular groove sunk in and encircling said electrode receiving bore between said inner end of said bore and the inner ends of said longitudinal splits, and a sealing ring seated in said groove.

7. In combination, a holder body having an externally screwthreaded nose, a uniform diameter rod receiving bore extending into said body through said nose, longitudinal splits formed in said nose whereby said nose may be compressed about a rod received in its said bore, a clamping nut screwthreaded on said nose and adapted to compress said nose about said rod when set up, said bore extending inwardly into said body beyond the inner ends of said splits, and being formed with an inner end serving as a seat for the the inner end of the received rod, there being a fluid passageway extending into said body past said seat, an annular groove sunk in and encircling said electrode receiving bore between said inner end of said bore and the inner ends of said splits, and a sealing ring seated in said groove.

8. In a welding electrode and electrode holder assembly, the combination of a holder body, an electrode rod having a shank portion detachably mounted on said body, a longitudinal coolant hole of predetermined depth in said electrode rod and opening through the shank end thereof, a coolant passageway in said body communicating with said coolant hole, a coolant supply tube in said body projecting inside said coolant hole and spaced from the wall surfaces of said hole to provide a coolant return passageway communicating with said coolant passageway in said body, the tip of said tube being spaced from the inner end of said coolant hole, and means operable from the exterior of said holder body for longitudinally moving said tube relative to said body for adjusting the spacing between the tip of said tube and the inner end of said coolant hole.

9. In a welding electrode and electrode holder assembly, the combination of a holder body, an electrode rod having a shank portion detachably mounted on said body, a longitudinal coolant hole of predetermined depth in said electrode rod and opening through the shank end thereof, a coolant passageway in said body communicating with said coolant hole, and a coolant supply tube in said body projecting inside said coolant hole and spaced from the wall surfaces of said hole to provide a coolant return passageway communicating with said coolant passageway in said body, the tip of said tube being spaced from the inner end of said coolant hole, the inner end of said coolant hole and the tip of the coolant supply tube being contoured to provide a streamlined channel of smooth continuous surfaces devoid of abrupt offsets connecting the inside of said tube with the space between said tube and the wall of said coolant hole whereby substantially nonturbulent flow is achieved in the region of the inner end of said coolant hole.

10. In a welding electrode and electrode holder assembly, the combination of a holder body, an electrode rod having a shank portion detachably mounted on said body, a longitudinal coolant hole of predetermined depth in said electrode rod and opening through the shank end thereof, a coolant passageway in said body communicating with said coolant hole, and a coolant supply tube in said body projecting inside said coolant hole and spaced from the wall surfaces of said hole to provide a coolant return passageway communicating with said coolant passageway in said body, the tip of said tube being spaced from the inner end of said coolant hole, the inner end of said coolant hole and the tip of the coolant supply tube being contoured to provide a streamlined channel section connecting the inside of said tube with the space between said tube and the wall of said coolant hole, said channel section having a Venturi-like restriction to a cross-sectional area substantially less than the cross-sectional areas of the flow paths within the said tube and between the said tube and the side wall of the coolant hole.

11. In a welding electrode and electrode holder assembly, the combination of a holder body, an electrode rod having a shank portion detachably mounted on said body, a longitudinal coolant hole of circular section and of predetermined depth in said electrode rod and opening through the shank end thereof, a coolant passageway in said body communicating with said coolant hole, and a coolant supply tube in said body projecting inside said coolant hole to a point proximate the inner end thereof and annularly spaced from the wall surfaces of said hole to provide a coolant channel consisting of concentric supply and return portions communicating with said coolant passageway in said body, the tip of said tube being sufficiently closely spaced from the inner end of said coolant hole so as to materially constrict the cross-sectional area of said fluid channel between the tip end of the supply tube and the inner end of said coolant hole, thereby increasing the velocity of flow of the coolant and reducing its pressure at the inner end of the coolant hole.

12. In a welding electrode and electrode holder assembly, the combination of a holder body, an electrode rod having a shank portion detachably mounted on said body, a longitudinal coolant hole of predetermined depth in said electrode rod and opening through the shank end thereof, a coolant passageway in said body communicating with said coolant hole, and a coolant supply tube in said body projecting inside said coolant hole and spaced from the wall surfaces of said hole to provide a coolant return passageway communicating with said coolant passageway in said body, the tip of said tube being spaced from the inner end of said coolant hole, and an enlarged annular bead on the tip end of said coolant supply tube, said bead having a bell-shaped mouth and the inner end of said coolant hole cooperating therewith in the definition of a streamlined, restricted channel across said inner end of said coolant hole.

13. In an assembly of the character described, the combination of a resistance welding electrode having a coolant cavity defined at least in part by an electrode surface from which heat is to be extracted, a holder for said electrode including, means on said holder cooperating with said cavity in the definition of a coolant channel extending across said surface, said means and said electrode surface being cooperatively profiled to define a constriction in the said channel by which the velocity of coolant flow is locally increased across said surface and the pressure of the fluid is correspondingly reduced.

14. In an assembly of the character described, the combination of a resistance welding electrode having a coolant cavity defined at least in part by an electrode surface from which heat is to be extracted, a holder for said electrode, means on said holder cooperating with said cavity in the definition of a coolant channel extending across said surface, said means and said electrode surface being cooperatively profiled to define a streamlined constriction in the said channel by which the velocity of coolant flow is locally increased, across said surface the pressure of the fluid is correspondingly reduced, and substantially nonturbulent flow is established.

15. In an assembly of the character described, the combination of a resistance welding electrode having a coolant cavity defined at least in part by an electrode surface from which heat is to be extracted, a holder for said electrode, means on said holder cooperating with said cavity in the definition of a coolant channel extending across said surface, said means and said electrode surface being cooperatively profiled to define a Venturi-tube constriction in the said channel by which the velocity of coolant flow is locally increased across said surface and the pressure of the fluid is correspondingly reduced.

16. In a welding electrode and electrode holder assembly, the combination of a holder body, an electrode rod having a shank portion detachably mounted on said body, a longitudinal coolant hole of predetermined depth in said electrode rod and opening through the shank end thereof, a coolant passageway in said body communicating with said coolant hole, and a coolant supply tube in said body projecting inside said coolant hole and spaced from the wall surfaces of said hole to provide a coolant return passageway communicating with said coolant passageway in said body, the tip of said tube being spaced from the inner end of said coolant hole, the inner end of said coolant hole being formed with a central cone directed toward the outer end of said hole, and the tip of said tube being profiled to cooperate with said cone formation in the definition of a restricted and streamlined inter-communication between the end of said tube and the space between said tube and the wall of the coolant hole.

17. A resistance welding electrode comprising a cylindrical rod having a straight sided, unthreaded shank of uniform diameter, and a coolant hole extending inwardly into said shank.

18. A resistance welding electrode comprising a rod formed with a longitudinal coolant hole opening through its butt end, said coolant hole having a streamlined inner end adapted to turn liquid received along its central longitudinal axis outwardly and rearwardly along the wall surfaces of said hole with a minimum of turbulence and flow resistance.

19. A resistance welding electrode comprising a rod formed with a longitudinal coolant hole opening through its butt end, said coolant hole having a streamlined inner end including a centrally positioned cone directed toward the open end of said coolant hole.

20. A resistance welding electrode comprising a rod formed with a longitudinal coolant hole opening through its butt end, said coolant hole having a streamlined inner end including a centrally positioned, concave-sided cone directed toward the open end of said coolant hole.

RICHARD C. BARKELEW.

REFERENCES CITED

The following references are of record in the file of this patent:

UNITED STATES PATENTS

| Number | Name | Date |
|---|---|---|
| 1,711,185 | Storm | Apr. 30, 1929 |
| 2,037,940 | Stalker | Apr. 21, 1936 |
| 2,080,626 | Mojonnier | May 18, 1937 |
| 2,088,936 | Von Henke | Aug. 3, 1937 |
| 2,138,388 | Platz | Nov. 29, 1938 |
| 2,271,119 | Cox et al. | Jan. 27, 1942 |
| 2,322,691 | Hensel | June 22, 1943 |
| 1,249,532 | Smith et al. | Dec. 11, 1917 |